(12) United States Patent
Sano

(10) Patent No.: US 9,277,175 B2
(45) Date of Patent: Mar. 1, 2016

(54) MOBILE TELEPHONE SET HAVING VIDEO-PHONE FUNCTION LOW IN AMOUNT OF HEAT GENERATION

(71) Applicant: LENOVO INNOVATIONS LIMITED (HONG KONG), Quarry Bay, Hong Kong (HK)

(72) Inventor: Hideo Sano, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 0 days.

(21) Appl. No.: 14/478,734

(22) Filed: Sep. 5, 2014

(65) Prior Publication Data

US 2014/0376615 A1    Dec. 25, 2014

Related U.S. Application Data

(63) Continuation of application No. 13/634,432, filed as application No. PCT/JP2011/052798 on Feb. 3, 2011, now abandoned.

(30) Foreign Application Priority Data

Mar. 18, 2010  (JP) ................................ 2010-062385

(51) Int. Cl.
*H04N 7/14* (2006.01)
*H04N 19/115* (2014.01)
*H04N 19/127* (2014.01)
*H04N 19/156* (2014.01)
*G01K 13/00* (2006.01)

(52) U.S. Cl.
CPC ............... *H04N 7/147* (2013.01); *G01K 13/00* (2013.01); *H04N 7/141* (2013.01); *H04N 19/115* (2014.11); *H04N 19/127* (2014.11); *H04N 19/156* (2014.11); *H04N 2007/145* (2013.01)

(58) Field of Classification Search
CPC ... H04N 7/141; H04N 19/156; H04N 19/115; H04N 19/127; H04N 7/147; H04N 7/14; H04N 2007/145; G01K 13/00
USPC ........................ 348/14.01–14.16; 375/240.02
See application file for complete search history.

(56) References Cited

U.S. PATENT DOCUMENTS

| 5,949,484 A | * | 9/1999 | Nakaya | ................. H04N 7/142 348/14.12 |
| 2008/0076471 A1 | * | 3/2008 | Yuki | ..................... H04N 7/142 455/556.1 |

(Continued)

FOREIGN PATENT DOCUMENTS

| EP | 1170948 | 1/2002 |
| JP | 8-009347 | 1/1996 |

(Continued)

OTHER PUBLICATIONS

International Search Report, PCT/JP2011/052798, Mar. 8, 2011.

(Continued)

*Primary Examiner* — Melur Ramakrishnaiah

(57) ABSTRACT

A temperature of a mobile telephone set is detected, and when the temperature exceeds a predetermined first threshold, a video signal encoding unit (21) is changed from the predetermined normal encoding rate to a reduced encoding rate, which is lower than the predetermined normal encoding rate.

20 Claims, 4 Drawing Sheets

(56) References Cited

U.S. PATENT DOCUMENTS

2008/0144949 A1\* 6/2008 Inoue .................. H04N 7/147
 382/233
2011/0164683 A1 7/2011 Takahashi et al.

FOREIGN PATENT DOCUMENTS

| JP | 2002-027145 | 1/2002 |
|----|-------------|--------|
| JP | 2003-199002 | 7/2003 |
| JP | 2005-352412 | 12/2005 |
| JP | 2007-049520 | 2/2007 |
| JP | 2007-312139 | 11/2007 |
| JP | 2008-283607 | 11/2008 |

OTHER PUBLICATIONS

Extended European Search Report dated Feb. 27, 2014; Application No. 11756007.8.
Wonbok Lee et al: "GOP-Level Dynamic Thermal Management in MPEG-2 Decoding", IEEE Transactions on Very Large Scale Integration (VLSI) Systems, IEEE Service Center, Piscataway, NJ, USA, vol. 16, No. 6, Jun. 1, 2008, pp. 662-672, XPO11214454.
Japanese Office Action—2012-505569—Jul. 16, 2014.

\* cited by examiner

| TEMPERATURE x | ENCODING RATE | |
|---|---|---|
| x ≤ 45.0°C | 15fps OR LESS | NORMAL |
| 45.0°C < x ≤ 45.5°C | 3fps OR LESS | REDUCED |
| 45.5°C < x ≤ 46.0°C | 0.5fps OR LESS | |
| 46.0°C < x | 0.2fps OR LESS | |

FIRST THRESHOLD : 45.0°C

FIG. 4

MOBILE TELEPHONE SET HAVING VIDEO-PHONE FUNCTION LOW IN AMOUNT OF HEAT GENERATION

TECHNICAL FIELD

This invention relates to a mobile telephone set having a video phone function for transmitting/receiving a video signal to/from a mobile telephone set of a communication partner.

BACKGROUND ART

In recent years, mobile telephone sets have been experiencing size reduction of casings and high-density mounting of devices, as well as significant improvements in multifunctionality by including a video phone function and providing a waterproof property to the casings, and in performance by increasing definition and image quality of installed devices such as a camera and a display.

Along with the improvements in multifunctionality and performance, a central processing unit (CPU), which is one of the installed devices of the mobile telephone set, is required to process a larger amount of data at higher speed. In particular, a large amount of data needs to be processed at high speed in reproducing high definition (HD) video and making video phone call, and hence power consumption of the CPU is very large.

While the power consumption of the CPU is being increased, there is a situation in which it is difficult for the casing of the mobile telephone set to radiate heat generated inside the casing due to the above-mentioned size reduction, high-density mounting, and provision of the waterproof property to the casing. Therefore, mobile telephone sets in recent years tend to generate a large amount of heat.

The heat generated by the mobile telephone set may not only damage the equipment and its devices, but also cause a burn of a user or a fire accident. Therefore, as represented by the Product Liability (PL) Act, measures against the heat generated by the mobile telephone set are one of important factors of product quality.

Technologies relating to reduction in power consumption of, and measures against the heat generated by, the mobile telephone set are disclosed in, for example, Patent Literature 1 (Japanese Unexamined Patent Application Publication (JP-A) No. 2002-27145) and Patent Literature 2 (Japanese Unexamined Patent Application Publication (JP-A) No. 2007-312139).

Patent Literature 1 discloses a mobile telephone set having a video phone function which, in order to reduce power consumption, is configured to stop, during a video phone call, decoding processing on a received video signal and/or encoding processing on a video signal to be transmitted in response to an operation of a user, and display and/or transmit to a communication partner an alternative image (still image). Patent Literature 1 also describes that heat generated by the mobile telephone set is suppressed by stopping the decoding processing and/or the encoding processing on the video signal when unnecessary.

Patent Literature 2 discloses a mobile telephone set having a video phone function which, in order to suppress an increase in temperature at a surface of a casing, is configured to, during a video phone operation, after a temperature signal from a temperature sensor for detecting a temperature near the mobile telephone set has exceeded a first threshold and further a grace period has elapsed, suspend a photographing operation of a camera and transmit an alternative image (still image) to an opposite side, and when the temperature signal falls to or below a second threshold, which is lower than the first threshold, return to the normal video phone operation.

However, in the technology disclosed in Patent Literature 1, the user judges whether or not to stop the decoding processing and/or the encoding processing on the video signal, and hence an operation closely associated with the situation of heat generation of the mobile telephone set is impossible. Further, when the decoding processing and/or the encoding processing on the video signal is stopped, the video of the video phone call that has been displayed is suddenly interrupted by the alternative image, which has been prepared in advance and is different from the situation during the video phone call, and hence the user and the communication partner feel uncomfortable.

Also in the technology disclosed in Patent Literature 2, when the photographing operation of the camera is suspended, the video of the video phone call that has been displayed is suddenly interrupted by the alternative image, which has been prepared in advance and is different from the situation during the video phone call, and hence the communication partner feels uncomfortable.

DISCLOSURE OF THE INVENTION

In view of the above-mentioned situation, this invention has an object of providing a mobile telephone set having a video phone function capable of reducing power consumption and suppressing heat generation without causing a communication partner to feel uncomfortable during a video phone call.

According to the present invention, there is provided a mobile telephone set having a video phone function for transmitting/receiving a video signal to/from equipment of a communication partner, the mobile telephone set including: a camera for outputting a photographed video as the video signal; and a video signal encoding unit for encoding the video signal from the camera at a predetermined normal encoding rate and outputting the encoded video signal, in which the mobile telephone set detects a temperature thereof, and when the temperature exceeds a predetermined first threshold, changes the video signal encoding unit from the predetermined normal encoding rate to a reduced encoding rate, which is lower than the predetermined normal encoding rate.

The above-mentioned mobile telephone set may further include: a temperature sensor for detecting the temperature of the mobile telephone set; and a rate control unit for changing, when the temperature detected by the temperature sensor exceeds the predetermined first threshold, the video signal encoding unit from the predetermined normal encoding rate to the reduced encoding rate.

When the temperature detected by the temperature sensor has exceeded the predetermined first threshold and further remains exceeding the predetermined first threshold after a predetermined grace period elapses, the rate control unit may change the video signal encoding unit from the predetermined normal encoding rate to the reduced encoding rate.

When the temperature detected by the temperature sensor falls to or below a second threshold, which is lower than the predetermined first threshold, after the video signal encoding unit is changed from the predetermined normal encoding rate to the reduced encoding rate, the rate control unit may change the video signal encoding unit from the reduced encoding rate back to the predetermined normal encoding rate.

When the temperature detected by the temperature sensor falls below the predetermined first threshold before the elapse of the predetermined grace period from when the temperature exceeded the predetermined first threshold, the rate control unit may control the video signal encoding unit to maintain the predetermined normal encoding rate.

The temperature sensor may at least detect a temperature of the video signal encoding unit. Alternatively, the above-mentioned mobile telephone set may further include a control unit for controlling entire operation of the mobile telephone set, in which the temperature sensor may at least detect temperatures of the control unit and the video signal encoding unit.

The change of the video signal encoding unit from the predetermined normal encoding rate to the reduced encoding rate may be accomplished by frame skip in encoding processing on the video signal.

The rate control unit may adjust the reduced encoding rate depending on the temperature of the mobile telephone set.

BRIEF DESCRIPTION OF THE DRAWING

FIG. 4 is a table diagram illustrating a relationship between detected temperatures and encoding rates, which illustrates an operation of a mobile telephone set according to a second embodiment of this invention.

BEST MODE FOR EMBODYING THE INVENTION

According to this invention, there is provided a mobile telephone set having a video phone function for transmitting/receiving a video signal to/from equipment of a communication partner, the mobile telephone set including: a camera for outputting a photographed video as the video signal; and a video signal encoding unit for encoding the video signal from the camera at a predetermined encoding rate (hereinafter, referred to as normal encoding rate) and outputting the encoded video signal.

In particular, the mobile telephone set according to this invention detects a temperature thereof, and when the detected temperature exceeds a predetermined first threshold, changes the video signal encoding unit from the normal encoding rate to an encoding rate (hereinafter, referred to as reduced encoding rate), which is lower than the normal encoding rate. The first threshold is set based on an upper limit temperature (safe temperature) that does not cause a damage to the equipment and its devices, a burn of a user, or a fire accident.

With the above-mentioned configuration, the mobile telephone set according to this invention is capable of reducing power consumption and suppressing heat generation without causing the communication partner to feel uncomfortable during a video phone call.

Specifically, when the temperature of the mobile telephone set increases, the mobile telephone set according to this invention reduces the encoding rate of the video signal encoding unit. Therefore, a consumption current is reduced, which results in a reduced amount of heat generated by energy consumption and in suppression of an increase in temperature.

Moreover, in the equipment of the communication partner of the video phone call, even though the video may become more like a picture-story show in some cases, frames of the video of the video phone call are continuously updated. Therefore, there never occurs a case where the video displayed on the equipment of the communication partner is interrupted or an alternative image that is different from the video during the video phone call is displayed, and the communication partner is not caused to feel uncomfortable.

Further, it is possible to prevent the mobile telephone set from exceeding the safe temperature, and hence to prevent a burn of the user or a fire accident, and a damage to the equipment and its devices.

Moreover, the mobile telephone set according to this invention operates so as not to exceed the safe temperature. Therefore, heat generating devices may be laid out assuming the safe temperature as the maximum temperature, which enables a device layout at higher density than in the conventional examples in which it has been necessary to design a layout assuming a temperature higher than the safe temperature. This also contributes to an increase in flexibility in designing a device layout.

First Embodiment

Figure 1:
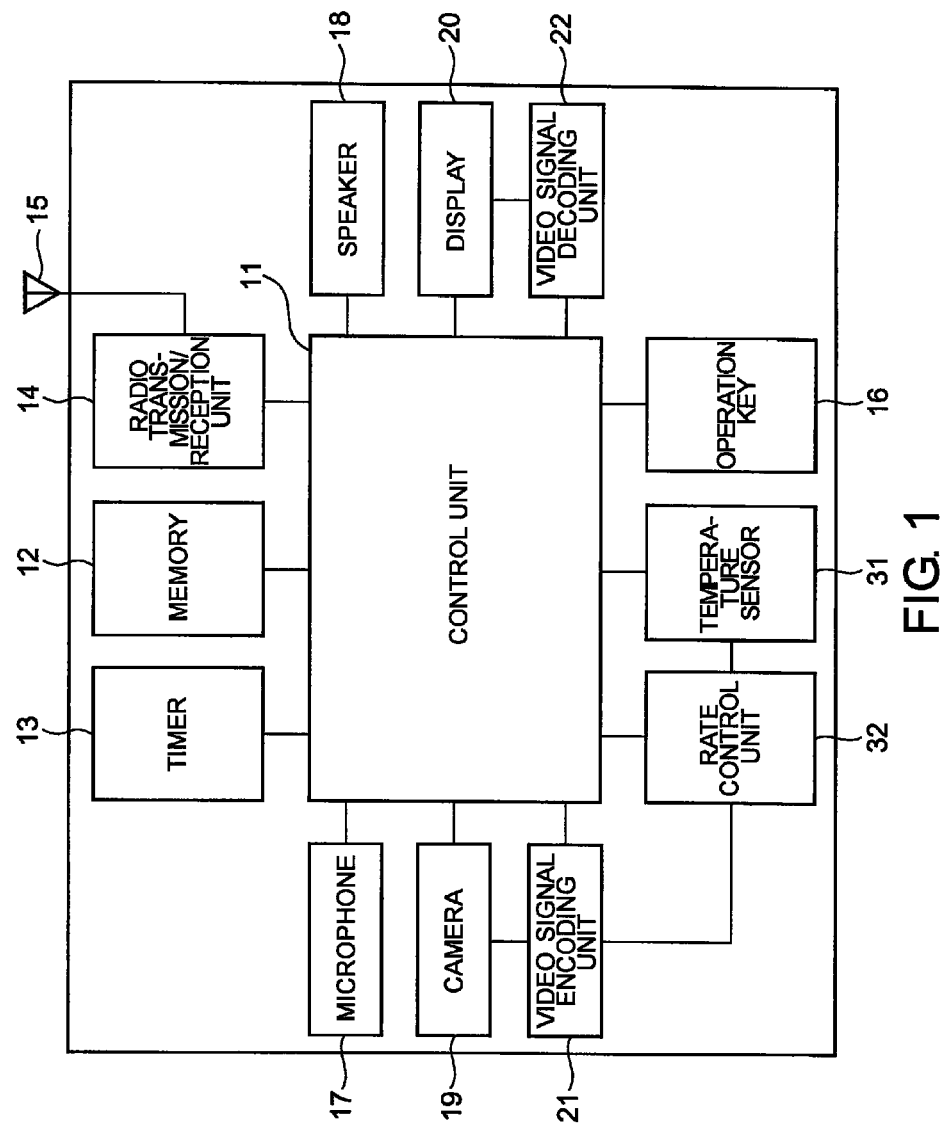
FIG. 1 is a block diagram illustrating a configuration of a mobile telephone set having a video phone function according to a first embodiment of this invention.

Referring to FIG. 1, a mobile telephone set having the video phone function according to a first embodiment of this invention includes a control unit 11, a memory 12, a timer 13, a radio transmission/reception unit 14, an antenna 15, an operation key 16, a microphone 17, a speaker 18, a camera 19, a display 20, a video signal encoding unit 21, and a video signal decoding unit 22.

The control unit 11 controls the entire operation of the mobile telephone set, and includes a central processing unit (CPU) for performing arithmetic processing in accordance with an operating system (OS) and application programs stored in advance in a read only memory (ROM) of the memory 12. Note that, the timer 13 may use a system clock of the control unit 11.

The memory 12 stores an image captured from the camera 19 as well as a character image for transmission to an opposite side during a video phone operation. The character image is used when the image captured from the camera 19 is not transmitted. Note that, the memory 12 may include, in addition to the above-mentioned ROM, a random access memory (RAM) for temporality storing data, and removable storage means such as a micro SD card.

The operation key 16 includes button keys such as a transmission key, an alphabet/kana/kanji/numeric change key, a power on/off key, a cursor key, and a termination key, and is a user interface for receiving an operation on the equipment by the user. Note that, the operation key 16 may include, in addition to the button keys, a touch pad or a touch panel.

The radio transmission/reception unit 14 transmits/receives an audio signal, a still image signal, a video signal, and a data signal in a radio wave as a transmission medium to/from the equipment (mobile telephone set, personal computer, fixed telephone set, facsimile machine, game machine, karaoke machine, television set top box (STB), interphone apparatus, or the like having the video phone function) (not shown) of the communication partner of the video phone call via the antenna 15 and a wireless base station (not shown). In transmitting/receiving the signals, the radio transmission/reception unit 14 combines and modulates the encoded video signal and encoded audio signal to be transmitted, and demodulates the received signals and separates the demodulated signals into the encoded video signal and the encoded audio signal. Note that, the wireless base station is connected to a fixed-line telephone network via a mobile communication control station, visitor mobile-services switching center, and gateway mobile-services switching center (not shown).

The speaker 18 emits sound in accordance with the audio signal obtained by decoding the encoded audio signal separated from the encoded video signal after being received and demodulated by the radio transmission/reception unit 14. The speaker 18 also emits sound corresponding to various kinds of information, such as a ring tone (trademark) and a voice during a phone call. Note that, the speaker 18 may also include a receiver to be placed against the user's ear during a voice call.

The video signal decoding unit 22 decodes the encoded video signal separated from the encoded audio signal after being received and demodulated by the radio transmission/reception unit 14, and outputs the decoded video signal as the video signal. The video signal is input to the display 20 via the control unit 11. The video signal and the audio signal are synchronized.

The display 20 displays the video signal input from the video signal decoding unit 22 via the control unit 11. The display 20 also displays, in a normal voice call, various kinds of information such as telephone number information and icon information of the other party, as well as an image stored in the memory 12.

The microphone 17 converts air vibration based on the voice of the user into the audio signal, which is an electric signal, for output. The audio signal is encoded via the control unit 11 and input as the encoded audio signal to the radio transmission/reception unit 14, in which the encoded audio signal is combined with the encoded video signal and then modulated for transmission.

The camera 19 includes a charge coupled device (CCD) sensor of about 4,000,000 pixels, for example, and outputs the photographed video as the video signal during a video phone call. The video signal is input to the video signal encoding unit 21 via the control unit 11.

The video signal encoding unit 21 encodes the video signal, which has been input from the camera 19 via the control unit 11, at the predetermined normal encoding rate and outputs the encoded video signal to the radio transmission/reception unit 14 via the control unit 11. The encoded video signal is demodulated after being combined with the encoded audio signal by the radio transmission/reception unit 14, and then transmitted from the antenna 15. The encoded video signal and the encoded audio signal are synchronized.

The mobile telephone set according to this embodiment, in particular, includes a temperature sensor 31 and a rate control unit 32.

The temperature sensor 31 is provided to a portion of a casing of the mobile telephone set that may be touched by the user or a portion of a constituent part of the mobile telephone set that is expected to generate a large amount of heat, such as near the video signal encoding unit 21 or the control unit 11, for detecting a temperature of the portion and outputting a temperature signal. The temperature signal is input to the rate control unit 32 via the control unit 11. Note that, the temperature sensor 31 may be provided to a plurality of positions of the mobile telephone set. In this case, of a plurality of the temperature signals, an average value thereof or the temperature signal of the highest temperature is used.

The rate control unit 32 periodically detects, at least during a video phone call, the temperature of the mobile telephone set by using the temperature sensor 31 and compares the temperature signal, which has been input from the temperature sensor 31 via the control unit 11, with the first threshold (for example, 45° C.). As a result of the comparison, when the temperature signal output from the temperature sensor 31 still exceeds the first threshold even after the elapse of a preset grace period from when the temperature signal exceeded the first threshold, the rate control unit 32 controls the video signal encoding unit 21 to change from the normal encoding rate to the reduced encoding rate, which is lower than the normal encoding rate. The first threshold is stored in advance in the memory 12, for example, and is referred to by the rate control unit 32 via the control unit 11. Further, the grace period is timed by using the timer 13. Note that, in this invention, the grace period may not be provided.

Note that, when the temperature detected by the temperature sensor 31 falls below the first threshold before the elapse of the grace period from when the temperature exceeded the first threshold, the rate control unit 32 controls the video signal encoding unit 21 to maintain the normal encoding rate.

Moreover, when the temperature detected by the temperature sensor 31 falls to or below a second threshold (for example, 40° C.), which is lower than the first threshold, after the video signal encoding unit 21 is changed from the normal encoding rate to the reduced encoding rate, the rate control unit 32 changes the video signal encoding unit 21 from the reduced encoding rate back to the normal encoding rate.

In this example, more specifically, the change of the video signal encoding unit 21 from the normal encoding rate to the reduced encoding rate is accomplished by frame skip in encoding processing.

In general, the video signal has a different data amount for each frame. When such video signal is encoded in a uniform manner, an encoded amount to be generated is also different for each frame, and hence transmission at a fixed transmission rate is difficult. In a case of transmission at low bit rate, the encoded amount to be transmitted may become insufficient, which may result in skipping encoding of some frames. According to this invention, this frame skip is utilized to skip frames in the encoding processing when the temperature is increased, to thereby reduce the encoding processing and the consumption current.

For example, in a case where the encoding format is MPEG-2, the amount of encoding processing required in the video signal encoding unit is as much as 1.1 Giga [operations/second], 13 Giga [operations/second], and 78 Giga [operations/second] for the profile level and image sizes of MP@LL, MP@ML, and MP@HL, respectively. Therefore, the frame skip reduces a significant amount of processing.

Figure 2:
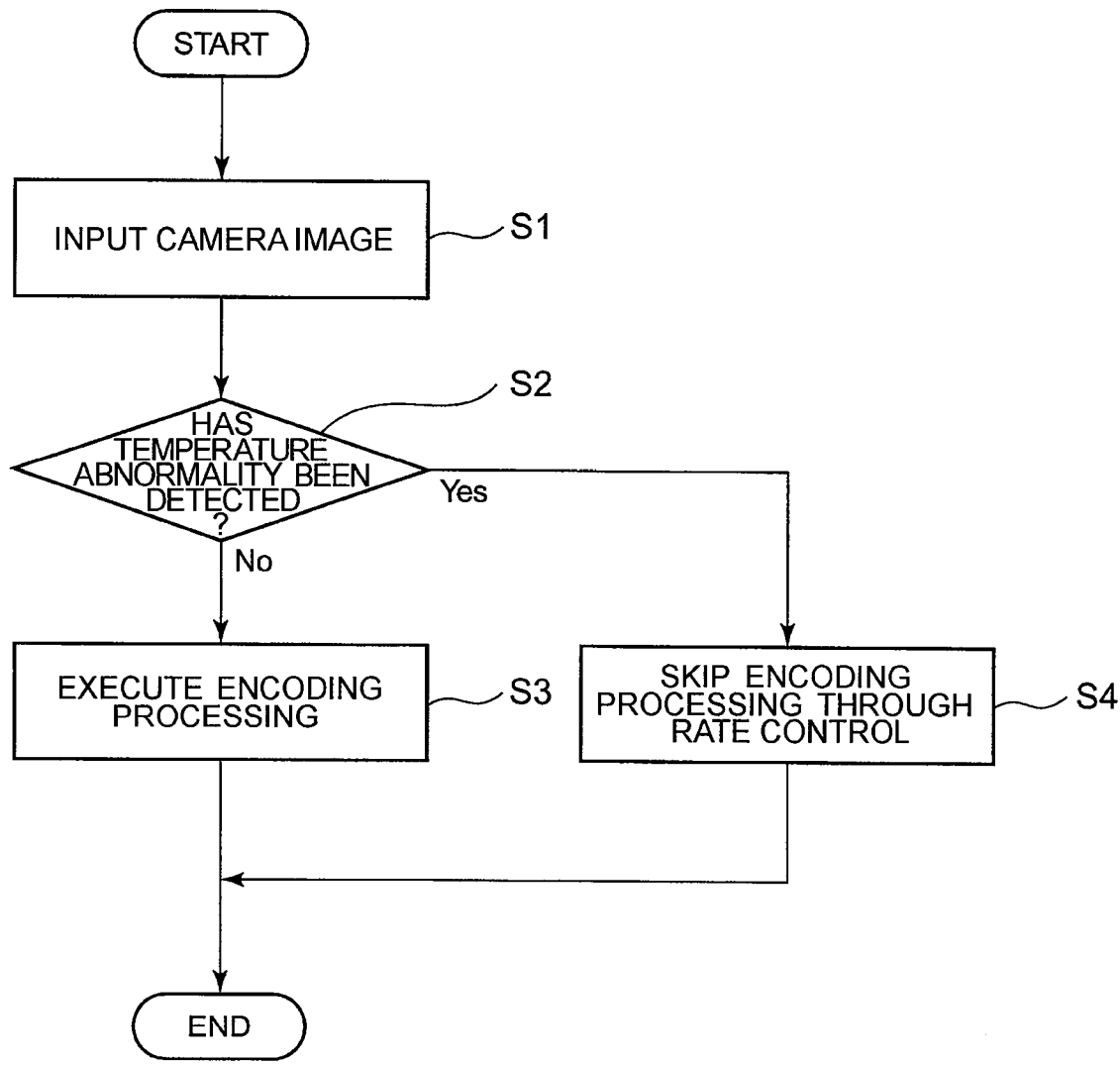
FIG. 2 is a flow chart illustrating an operation of the mobile telephone set illustrated in FIG. 1.
Figure 3:
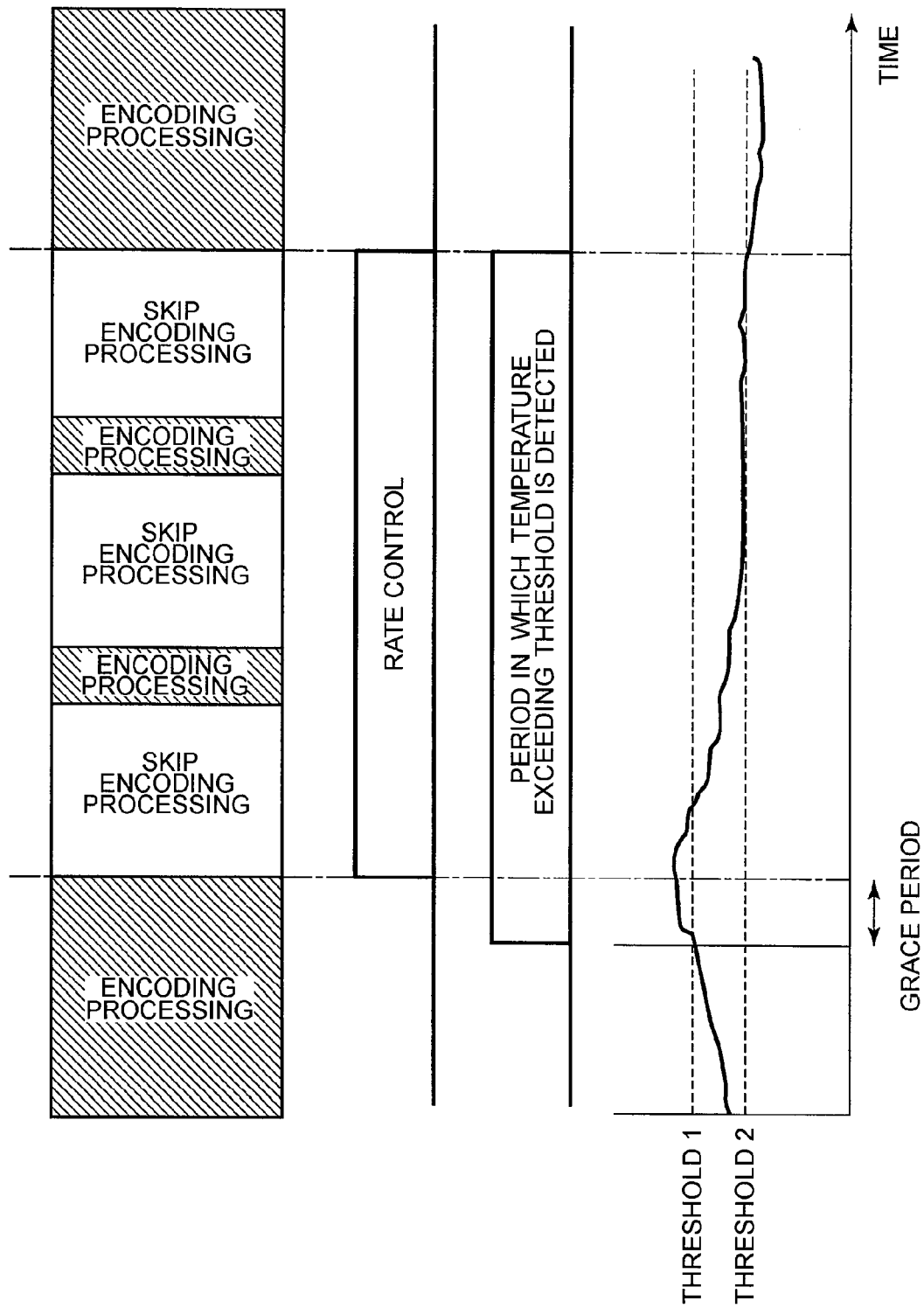
FIG. 3 is a time chart illustrating the operation of the mobile telephone set illustrated in FIG. 1.

Next, referring to FIGS. 1 to 3, operation of the mobile telephone set according to this embodiment is described.

The settings of the normal encoding rate: 15 fps, the reduced encoding rate: 3 fps, the first threshold: 45° C., the second threshold: 40° C., and the grace period: 30 seconds are stored in the memory 12.

Now, when the user gives an instruction to start a video phone call by using the operation key 16, or receives a request for a video phone call from the equipment of the communication partner of the video phone call, the control unit 11 starts the video phone call. Note that, descriptions of the processing for transmission and reception of the audio signal accompanying the video signal and the reception of the video signal are omitted.

In Step S1, the camera 19 outputs the photographed video as the video signal. The video signal is input to the video signal encoding unit 21 via the control unit 11.

In Step S2, the control unit 11 uses the temperature sensor 31 to detect the temperature of the mobile telephone set to output the temperature signal. The temperature signal is input to the rate control unit 32 via the control unit 11. The rate control unit 32 compares, at predetermined time intervals, the temperature signal, which has been input from the temperature sensor 31 via the control unit 11, with the first threshold (45° C.).

As a result of the comparison, when the temperature signal is equal to or less than the first threshold, the rate control unit 32 outputs no signal, and the video signal encoding unit 21 encodes the video signal input from the camera 19 via the control unit 11 at the normal encoding rate (15 fps) (Step S3) and outputs the encoded video signal to the radio transmission/reception unit 14 via the control unit 11. The encoded video signal is combined by the radio transmission/reception unit 14 with the encoded audio signal, and then demodulated and transmitted from the antenna 15. The encoded video signal and the encoded audio signal are synchronized.

On the other hand, as the result of the comparison, when the temperature signal exceeds the first threshold, the rate control unit 32 starts timing by using the timer 13 from that time point.

Then, when the temperature signal output from the temperature sensor 31 falls to or below the first threshold before the elapse of the grace period (30 seconds), the rate control unit 32 outputs no signal, and the video signal encoding unit 21 continues encoding the video signal from the camera 19 at the normal encoding rate (Step S3).

On the other hand, when the temperature signal output from the temperature sensor 31 still exceeds the first threshold after the elapse of the preset grace period from when the temperature signal exceeded the first threshold, the rate control unit 32 changes the video signal encoding unit 21 from the normal encoding rate to the reduced encoding rate (3 fps), which is lower than the normal encoding rate. In other words, the rate control unit 32 instructs the video signal encoding unit 21 to skip frames. At this time, the rate control unit 32 outputs encoded data (No Update) indicating no need for update to the control unit 11 as needed. The video signal encoding unit 21 executes the frame skip as illustrated in FIG. 3 (Step S4).

Then, when the temperature detected by the temperature sensor 31 falls to or below the second threshold (40° C.), which is lower than the first threshold, after the change of the video signal encoding unit 21 from the normal encoding rate to the reduced encoding rate, the rate control unit 32 changes the video signal encoding unit 21 from the reduced encoding rate back to the normal encoding rate.

Note that, the "encoded data indicating no need for update" refers to stuffing data or stuffing macro block (MB). When the frame skip is executed, the stuffing data or the stuffing MB needs to be transmitted because the communication system of a common video phone call in line switching is fixed transmission. On the other hand, in the case of a video phone call employing the packet communication system, unnecessary packets are not transmitted and hence the stuffing data is not transmitted.

As described above, the power consumption may be reduced and the heat generation may be suppressed without causing the communication partner to feel uncomfortable during a video phone call.

Second Embodiment

A second embodiment of this invention is different from the first embodiment in that the reduced encoding rate is variable. Therefore, for parts in the second embodiment that are the same as or similar to those of the first embodiment, the drawings of the first embodiment are incorporated and detailed descriptions of the parts are omitted.

A mobile telephone set having the video phone function according to the second embodiment of this invention includes, similarly to the first embodiment, the control unit, the memory, the timer, the radio transmission/reception unit, the antenna, the operation key, the microphone, the speaker, the camera, the display, the video signal encoding unit, the video signal decoding unit, the temperature sensor, and the rate control portion.

In particular, in the mobile telephone set according to this embodiment, as illustrated in FIG. 4, the rate control unit adjusts the reduced encoding rate in a range of from 3 fps or less to 0.2 fps or less, for example, depending on a temperature X of the mobile telephone set. In other words, when the increase in temperature is relatively small, the frame skip is reduced (the encoding rate is increased) to update the image smoothly, and when the increase in temperature is relatively large, the frame skip is increased (the encoding rate is decreased) to significantly reduce the encoding processing.

INDUSTRIAL APPLICABILITY

It should be understood that this invention is not limited to the embodiments described above, and various modifications may be made thereto without departing from the technical scope described in the claims. For example, this invention is applicable not only to the mobile telephone set, but also to electronic equipment having a video phone function in general, such as a personal computer, a fixed telephone set, a facsimile machine, a game machine, a karaoke machine, a television receiver, a television set top box (STB), and an interphone apparatus.

Further, this application claims the benefit of Japanese Patent Application No. 2010-062385, filed on Mar. 18, 2010, the contents of which are incorporated herein by reference in its entirety.

The invention claimed is:

1. A mobile telephone set having a video phone function for transmitting/receiving a video signal to/from equipment of a communication partner, the mobile telephone set comprising:
   a camera for outputting a photographed video as the video signal; and
   a video signal encoding unit for encoding the video signal from the camera at a predetermined normal encoding rate and outputting the encoded video signal,
   wherein the mobile telephone set detects a temperature thereof, and when the temperature exceeds a predetermined first threshold, changes the video signal encoding unit from the predetermined normal encoding rate to a reduced encoding rate, which is lower than the predetermined normal encoding rate.

2. A mobile telephone set according to claim 1, further comprising:
   a temperature sensor for detecting the temperature of the mobile telephone set; and
   a rate control unit for changing, when the temperature detected by the temperature sensor exceeds the predetermined first threshold, the video signal encoding unit from the predetermined normal encoding rate to the reduced encoding rate.

3. A mobile telephone set according to claim 2, wherein when the temperature detected by the temperature sensor has exceeded the predetermined first threshold and further remains exceeding the predetermined first threshold after a predetermined grace period elapses, the rate control unit changes the video signal encoding unit from the predetermined normal encoding rate to the reduced encoding rate.

4. A mobile telephone set according to claim 2, wherein when the temperature detected by the temperature sensor falls to or below a second threshold, which is lower than the predetermined first threshold, after the video signal encoding unit is changed from the predetermined normal encoding rate to the reduced encoding rate, the rate control unit changes the video signal encoding unit from the reduced encoding rate back to the predetermined normal encoding rate.

5. A mobile telephone set according to claim 3, wherein when the temperature detected by the temperature sensor falls below the predetermined first threshold before the elapse of the predetermined grace period from when the temperature exceeded the predetermined first threshold, the rate control unit controls the video signal encoding unit to maintain the predetermined normal encoding rate.

6. A mobile telephone set according to claim 2, wherein the temperature sensor at least detects a temperature of the video signal encoding unit.

7. A mobile telephone set according to claim 2, further comprising a control unit for controlling entire operation of the mobile telephone set,
wherein the temperature sensor at least detects temperatures of the control unit and the video signal encoding unit.

8. A mobile telephone set according to claim 1, wherein the change of the video signal encoding unit from the predetermined normal encoding rate to the reduced encoding rate is accomplished by frame skip in encoding processing on the video signal.

9. A mobile telephone set according to claim 2, wherein the rate control unit adjusts the reduced encoding rate depending on the temperature of the mobile telephone set.

10. A mobile telephone set according to claim 3, wherein when the temperature detected by the temperature sensor falls to or below a second threshold, which is lower than the predetermined first threshold, after the video signal encoding unit is changed from the predetermined normal encoding rate to the reduced encoding rate, the rate control unit changes the video signal encoding unit from the reduced encoding rate back to the predetermined normal encoding rate.

11. A mobile telephone set according to claim 4, wherein when the temperature detected by the temperature sensor falls below the predetermined first threshold before the elapse of the predetermined grace period from when the temperature exceeded the predetermined first threshold, the rate control unit controls the video signal encoding unit to maintain the predetermined normal encoding rate.

12. A mobile telephone set according to claim 3, wherein the temperature sensor at least detects a temperature of the video signal encoding unit.

13. A mobile telephone set according to claim 4, wherein the temperature sensor at least detects a temperature of the video signal encoding unit.

14. A mobile telephone set according to claim 5, wherein the temperature sensor at least detects a temperature of the video signal encoding unit.

15. A mobile telephone set according to claim 3, further comprising a control unit for controlling entire operation of the mobile telephone set,
wherein the temperature sensor at least detects temperatures of the control unit and the video signal encoding unit.

16. A mobile telephone set according to claim 4, further comprising a control unit for controlling entire operation of the mobile telephone set,
wherein the temperature sensor at least detects temperatures of the control unit and the video signal encoding unit.

17. A mobile telephone set according to claim 5, further comprising a control unit for controlling entire operation of the mobile telephone set,
wherein the temperature sensor at least detects temperatures of the control unit and the video signal encoding unit.

18. A mobile telephone set according to claim 6, further comprising a control unit for controlling entire operation of the mobile telephone set,
wherein the temperature sensor at least detects temperatures of the control unit and the video signal encoding unit.

19. A mobile telephone set according to claim 2, wherein the change of the video signal encoding unit from the predetermined normal encoding rate to the reduced encoding rate is accomplished by frame skip in encoding processing on the video signal.

20. A mobile telephone set according to claim 3, wherein the change of the video signal encoding unit from the predetermined normal encoding rate to the reduced encoding rate is accomplished by frame skip in encoding processing on the video signal.

* * * * *